United States Patent [19]

Tamura et al.

[11] Patent Number: 5,004,511
[45] Date of Patent: Apr. 2, 1991

[54] PROCESS FOR PRODUCING NON-WOVEN FABRICS OF CARBON FIBERS

[75] Inventors: Tatsuya Tamura; Akio Takamatsu, both of Kamisumachi, Japan

[73] Assignee: Petoca Ltd., Tokyo, Japan

[21] Appl. No.: 313,835

[22] Filed: Feb. 23, 1989

[30] Foreign Application Priority Data

Feb. 26, 1988 [JP] Japan .................................. 63-41975

[51] Int. Cl.$^5$ ............................................. B32B 11/02
[52] U.S. Cl. ...................................... 156/89; 156/242; 423/447.1; 423/447.4; 264/29.1; 264/29.5; 264/29.6
[58] Field of Search ................. 156/89, 242; 264/29.1, 264/29.2, 29.5, 29.6; 423/447.1, 447.4

[56] References Cited

U.S. PATENT DOCUMENTS 4,350,672  9/1982  Layden et al. ...................... 423/445
4,776,995  10/1988  Nelson et al. .................... 423/447.4
4,849,200  7/1989  Uemura et al. ................... 423/447.4

FOREIGN PATENT DOCUMENTS 4732148  11/1969  Japan .
50-101405  1/1975  Japan .
5247014  10/1975  Japan .
6290320  10/1985  Japan .

Primary Examiner—Caleb Weston
Attorney, Agent, or Firm—Armstrong, Nikaido, Marmelstein, Kubovcik & Murray

[57] ABSTRACT

A process is provided for producing non-woven fabrics in which adhered points supporting the non-woven fabrics structure are the same carbon materials with the component fibers and which is superior in strength, dimensional stability, heat-resisting property, chemical resistance, electric conductivity, etc.

This process comprises mixing spun pitch fibers or insufficiently infusiblized pitch fibers with infusiblized pitch fibers or carbonized pitch fibers, shaping the mixture into a sheet or the like and thereafter carbonizing the shaped mixture in the atmosphere of an inert gas to mutually fix the component fibers by utilizing the adhering property of the spun pitch fibers or the insufficiently infusiblized pitch fibers during the carbonization.

2 Claims, No Drawings

PROCESS FOR PRODUCING NON-WOVEN FABRICS OF CARBON FIBERS

BACKGROUND OF THE INVENTION

This invention relates to a process for producing non-woven fabrics of carbon fibers. More particularly, it relates to a process for producing non-woven fabrics in which adhering points supporting the non-woven fabrics structure are the same carbon materials with the component fibers and which is superior in strength, dimensional stability, heat-resisting property, chemical resistance, electric conductivity, etc.

Since the non-woven fabrics produced according to the process of the present invention are constructed with carbon materials, i.e., not only the fibers but also even adhering points are constituted with carbon materials, the fabrics have advantages that they can fully exhibit superior physical and chemical characteristic properties of carbon materials.

The production of non-woven fabrics which utilize self-adhesion of fibers is widely put into practice in case of synthetic composite fibers in which a higher melting point polymer of core and a lower melting point polymer of sheath are combined.

In case of carbonized fibers, since there is substantially no softening point, adoption of the same process with synthetic fibers is impossible. However, it is possible to cause self-adhesion in the stage of precursor fibers. For example, Japanese laid open patent application No. Sho 50-101405 describes to produce non-woven fabrics by self-adhesion of lightly or not infusiblized pitch fibers. However, in this application, it is inferred that the behavior of the fibers is considerably different from pure pitch fibers, because a large amount of silicon compound and alumina are mixed therein. It is inferred that silicon compounds and alumina suppresses the deformation of the pitch which is at the higher temperature than its softening point, performs by such a behavior as the core component of composite fibers of synthetic fibers and prevent pitch fibers from turning into droplets. It is not suggested that non-woven fabrics are formed by self-adhesion of pure pitch fiber.

In the Japanese laid open patent application No. Sho 52-47014, there is disclosed a process in which lightly or not infusiblized pitch fibers are formed beforehand into an arbitrary shape and thereafter made into a porous shaped body by self-adhesion. This process is superior as a production process of a porous shaped body, but if it is evaluated as a production process of non-woven fabrics, there is a problem that since change of shape of the pitch fibers is so great that resulting non-woven fabrics are of high density and hard products like a fiber-board which is difficult to handle as a cloth.

It is an object of the present invention to provide a process which can overcome the problem of the non-woven fabrics of pitch-based carbon fibers produced by self-adhesion according to conventional process of art and having so great a density that handling as a cloth is difficult, and which enables to produce non-woven fabrics constructed with carbon materials both in fibers and in binder at an inexpensive cost.

Summary of the Invention

A process for producing non-woven fabrics of carbon fibers which comprises mixing spun pitch fibers or insufficiently infusiblized pitch fibers with infusiblized pitch fibers or carbonized pitch fibers, shaping the mixture into a sheet or the like and thereafter carbonizing the shaped mixture in the atmosphere of an inert gas to mutually fix the component fibers by utilizing the adhering property of the spun pitch fibers or the insufficiently infusiblized pitch fibers during the carbonization.

In the present invention, the component which causes self adhesion is the spun pitch fibers or the insufficiently infusiblized pitch fibers. Since pitch fibers increases its elongation if subjected to infusiblization treatment and turns to the state tolerable to a treatment requiring force, when fiber blending is carried out as in usual fibers, it is preferable that fiber blending is carried out after being subjected to infusibilization treatment.

However, infusiblization treatment of pitch fibers is a time-consuming step. It is difficult to be operated continuously with spinning. If it is omitted, a considerable cost saving can be attained. If insufficient blending with principal fibers is allowable, the use of the spun pitch fibers is preferable.

Insufficiently infusiblized pitch fibers as a component which generates self-adhesion (hereinafter referred to as binder) have an oxygen content of 90 % or less relative to the oxygen content of fully infusiblized pitch fibers. The oxygen content in case of fully infusiblized varies according to a raw material pitch, but it is in the range of 3–12%. In case of an optically anisotropic pitch as raw material pitch, it is in the range of 3%–6%.

Insufficient infusiblization treatment is attained by increasing the temperature rising rate at the time of treatment, raising the treatment initiating temperature, lowering the treatment finishing temperature or lowering the oxygen concentration at the time of the treatment is used.

In the present invention, principal fibers are the infusiblized pitch fibers or the carbonized pitch fibers. The principal fibers are treated in the form of filaments or sheet. For processing these principal fibers into non-woven fabrics, there are some processes, e.g., a process in which the principal fibers are opened and thereafter are mixed with binder to turn into a sheet, a process in which a unified sheet is prepared by scattering binder upon a sheet of principal fiber and inter fiber fixing is carried out with a binder.

In the process where principal fibers are mixed with binder after being opened, and made into a sheet, a uniform highly bulky non-woven fabrics can be obtained, but damage and breakage of principal fibers and binder fibers cannot completely be suppressed and complete avoidance of loss of fibers is difficult.

According to the process of scattering binder upon a sheet of principal fibers, it is difficult to uniformly mix binder fibers even if a sheet of principal fibers may be very thin. In the parts where binder fibers are densely collected, since the fibers show shrinkage by melting at the time of carbonization, turning of sheets into higher density occurs and resulting non-woven fabrics show fluctuation of density periodically as in case of annual ring of wood. Such non-woven fabrics are certainly non-uniform and poor in bulkiness, but superior in dimensional stability and shock resistance and show superior properties as fibrous reinforced material of composite materials. Further, by impregnation of soft synthetic resin, they show superior property as absorbents of vibration. Further, to the penetration of edged tools, needles or the like, they show better resistance than uniform non-woven fabrics structure.

As processes to form fibrous liquid streams of principal fibers and binder fibers from melted pitch and further turn into sheet, any of the processes of spun-bond type spinning process in which extruding from usual spinning nozzles and pulling out by gas stream or rollers are carried out, melt blow type spinning process in which extruding is carried out from a spinning hole or a slit having an outlet in a high speed gas stream and a centrifugal spinning process in which scattering is carried out from a pot revolving at a high speed by way of centrifugal force and turned into liquid stream can be used, but especially melt blow process is preferable.

Various melt blow processes, such as a process in which spinning holes are arranged in one line or a slit is provided in a discharging slit of a high velocity gas stream and a process in which one or several spinning holes are provided in a discharging hole of a high velocity gas stream, have been known, and for the present invention any of the processes can be used.

The pitch used in the present invention is a high softening point pitch capable of being subjected to melt-spinning and infusiblization treatment, preferably an optically anisotropic pitch. It is most preferably a substantially 100 % optically anisotropic pitch.

The pitch used in the present invention may be one kind or a mixture of two or more kinds. Mixing of two or more kinds of pitch for spinning solution is not preferable in regard to spinning condition, but by the spinning of different kinds of pitch from different spinning holes, it is possible to produce a mixture of pitch fibers having different infusiblization velocity, to turn the low infusiblization velocity pitch fibers into the insufficiently infusiblized pitch fibers and to use it as a binder. Further, by utilizing the fact that the shrinkage of fibers during the carbonization varies according to the molecular structure of the pitch, it is possible to change bulkiness of sheets.

The non-woven fabrics produced according to the present invention can be given higher electric conductivity by carrying out higher extent of carbonization. Non-woven fabrics having higher electric conductivity can be used as shielding materials for an electromagnetic wave, surface heat generating bodies, electrode materials, catalyst carriers, etc.

The non-woven fabrics produced according to the present invention can contain metal nets, fabrics of carbon fibers, products of ceramics fibers, etc. in the inside or on the surface for the purpose of improvement of electric conductivity, a shape stability, etc. Further, it may contain adhesive layer or sticking agent layer in order to stick to other material. It is possible to carry out processing such as flocking, flock finishing, resin coating, laminate processing with film.

The present invention is further illustrated by the following non-limitative examples.

EXAMPLE 1.

A raw material which was a petroleum based pitch having a softening point of 285° C. and 100% optically anisotropic proportion was melt-spun by using a spinneret having 0.8 mm diameter spinning holes in which tubular nozzles for discharging the raw material having an inside diameter of 0.3 mm, an outside diameter of 0.6 mm accommodated therein, and by pulling out with blowing heated air from the circumference of the tubular nozzles. Flow rate of the pitch was 12 g/80 hole. min., pitch temperature was 320° C., spinneret temperature was 420° C., heated air rate was 0.40 Kg/min., heated air temperature was 420° C. and pressure of heated air was 1.5 kg/cm$^2$ G.

Spun fibers were collected on a belt suctioned from the back surface of the belt, collecting part of which is made of 20 mesh stainless metal screen. Resulting sheet was subjected to infusiblization treatment while the temperature thereof being elevated up to 300° C. at a heating rate of 1.0° C./min. (This will be referred to as sheet A).

By using the same raw material with that of sheet A and under the same spinning condition, fibers were spun and while thus spun fiber being suctioned with an aspirator, opened fibers of sheet A was fed into the said aspirator to effect mixing, mixed fibers were collected on a belt suctioned from the back side of the belt, the collecting part of which is made of 20 mesh stainless steel metal screen. Resulting sheet was subsequently subjected to infusiblization treatment while its temperature being elevated until 270° C. at a heating rate of 2° C./min. ( This will be referred to as sheet B).

The spun fibers in the sheet B which are not from the sheet A were insufficient in infusiblization, and when the sheet B was carbonized in an inert gas furnace at a maximum temperature of 2000° C., the resulting sheet of carbon fibers was adhered at the crossing points of fibers and was turned into unified non-woven fabrics.

The resulting non-woven fabrics had a bulk density of about 0.12, high bulkiness, high elasticity, high heat insulation property and superior properties as filtration materials.

COMPARATIVE EXAMPLE 1.

When the sheet A of example 1 was subjected to carbonization treatment, the sheet A turned into a sheet having almost no adhesion point. Unification as non-woven fabric have not been performed.

Further, the condition of infusiblization treatment of the sheet A of Example 1 was changed to a heating rate of 2° C./min. and a highest temperature of 270° C. When this sheet was subjected to carbonization treatment according to an usual process, the sheet showed adhesion by melting at the crossing point of fibers and unified non-woven fabrics was formed, but a bulk density was 0.25 and the sheet had a card board feeling.

EXAMPLE 2.

A raw material which was a petroleum based pitch having a softening point of 287° C., optically anisotropic proportion of 99 % was spun from a spinneret having 3000 spinning holes having a diameter of 0.15 mm arranged in 3 straight line rows and immediately after cooling spun filaments were suctioned through slit-form drawing nozzle, and ejected upon a net conveyor to pile thereupon in sheet form, (This will be referred to as sheet C). After pressing resulting sheets between net conveyers, infusiblization was carried out according to a usual process.

Pitch fibers were further spun upon the resulting sheet under the same condition with sheets C and laminated (This will be referred to as sheet D).

Those in which 5 sheets of sheet D were laminated were prepared and subjected to light infusiblization treatment at a heating rate of 3° C./min. and a highest temperature of 280° C. and further subjected to carbonization treatment according to a usual process. Resulting sheet was a non-woven fabrics of carbon fibers having a large repulsion force in which layers of high bulk density and a layers of low bulk density are alternately piled up.

Function and Effectiveness

This invention relates to a process for producing non-woven fabrics of carbon fibers superior in strength, dimensional stability, heat resisting property, chemical resistance, electric conductivity, etc. in which adhered points supporting the non-woven fabric structure are the same carbon materials with the component fibers.

The non-woven fabrics of carbon fibers of the present invention can be used in filtration materials for chemicals, industrial gas, etc., particularly, filtration materials useful at high temperature, high temperature insulation materials under non-oxidative atmosphere electrode materials, parts of fuel electric cell, capacitator parts, catalyst carrier, etc. Further, non-woven fabrics of carbon fibers of the present invention can be used as reinforcement materials for plastics, cement mortar and carbon materials.

What is claimed is:

1. A process for producing non-woven fabrics of carbon fibers which comprises mixing spun pitch fibers with infusibilized pitch fibers or carbonized pitch fibers, shaping the mixture into a sheet, insufficiently infusibilizing the shaped mixture and thereafter carbonizing the shaped mixture in an atmosphere of an inert gas to mutually fix the component fibers by utilizing the adhering property of the insufficiently infusibilized pitch fibers during the carbonization.

2. A process for producing non-woven fabrics of carbon fibers which comprises mixing insufficiently infusibilized pitch fibers with infusibilized pitch fibers or carbonized pitch fibers, shaping the mixture into a sheet and thereafter carbonizing the shaped mixture in an atmosphere of an inert gas to mutually fix the component fibers by utilizing the adhering property of the insufficiently infusibilized pitch fibers during the carbonization.

* * * * *